(12) United States Patent
Shaburov et al.

(10) Patent No.: US 7,823,078 B2
(45) Date of Patent: Oct. 26, 2010

(54) NOTE NAVIGATION IN A BUSINESS DATA PROCESSING APPLICATION

(75) Inventors: Victor Shaburov, Leimen (DE); Alexey Medvedev, Leimen (DE); Peter Harbusch, Mannheim (DE); Thomas Arend, Mannheim (DE); Peter Giese, Kaiserslautem (DE)

(73) Assignee: SAP AG, Walldorf (DE)

( * ) Notice: Subject to any disclaimer, the term of this patent is extended or adjusted under 35 U.S.C. 154(b) by 1474 days.

(21) Appl. No.: 10/869,650

(22) Filed: Jun. 15, 2004

(65) Prior Publication Data

US 2005/0278372 A1 Dec. 15, 2005

(51) Int. Cl.
*G06F 17/30* (2006.01)
(52) U.S. Cl. .................. 715/776; 715/777; 715/778; 715/779; 707/813
(58) Field of Classification Search .............. 707/1, 707/3, 4
See application file for complete search history.

(56) References Cited

U.S. PATENT DOCUMENTS 6,351,271 B1 * 2/2002 Mainwaring et al. ........ 715/744
2002/0099552 A1 * 7/2002 Rubin et al. ................ 704/270
2005/0182773 A1 * 8/2005 Feinsmith ................... 707/100

OTHER PUBLICATIONS

Microsoft Windows XP, New Tools to Use with Your PC, pp. 1-3, Nov. 7, 2002.

* cited by examiner

*Primary Examiner*—Neveen Abel Jalil
*Assistant Examiner*—Farhan M Syed
(74) *Attorney, Agent, or Firm*—Finnegan, Henderson, Farabow, Garrett & Dunner, LLP

(57) ABSTRACT

Methods and apparatus, including computer program products, implementing techniques for business data processing. The techniques include displaying business data on a user interface through which users can view the business data and provide input modifying the business data. The business data comprises a plurality of business objects. The techniques further include receiving one or more first user inputs, each first user input requesting creation of a note and specifying the contents of the note to be created; in response to each of the first user inputs, creating a note and binding the note to one of the business objects; receiving a second user input selecting one of the notes; and in response to the second user input, navigating from the selected note to the business object bound to the selected note.

15 Claims, 3 Drawing Sheets

NOTE NAVIGATION IN A BUSINESS DATA PROCESSING APPLICATION

BACKGROUND

The present invention relates to data processing by digital computer, and more particularly to business data processing.

Applications exist for processing business data, for example, sales data, customer service data, inventory data, or accounting data.

Such applications typically require users to enter business data in a structured format. In other words, the application does not allow users to enter data in a free-style manner. Instead, the data must be entered according to certain constraints imposed by the application. For example, the application may provide forms with various input fields that the user must complete in order to enter business data into the application. The application may require that the input fields be completed in a particular order. Further, the application may restrict the length, type, and format of the data that is entered into a particular field.

In some such applications, some of the forms may include a note control, for example, a text box, where users can store notes in an unstructured format. Such a note control, however, must be modeled for the form, and is only visible and accessible from the particular form for which it is modeled.

Users of a business data processing application can take notes using a separate note-taking application. Typically, however, the note-taking application is not integrated with the business data processing application and does not have access to the business data stored in the business data processing application.

SUMMARY OF THE INVENTION

The present invention provides methods and apparatus, including computer program products, that implement techniques for business data processing.

In one aspect, the techniques include displaying business data on a user interface through which users can view the business data and provide input modifying the business data. The business data comprises a plurality of business objects. The techniques further include receiving one or more first user inputs, each first user input requesting creation of a note and specifying the contents of the note to be created; in response to each of the first user inputs, creating a note and binding the note to one of the business objects; receiving a second user input selecting one of the notes; and in response to the second user input, navigating from the selected note to the business object bound to the selected note.

The techniques can be implemented to include one or more of the following features.

Receiving a second user input selecting one of the created notes includes receiving user input selecting a note from a displayed list of notes.

Navigating from the selected note to the business object bound to the selected note includes closing the displayed list of notes; and displaying the business object bound to the selected note.

Displaying business data includes displaying the business data in a structured format. The content of the note is specified in an unstructured format.

The input modifying the business data is keyboard input. The first user input specifying the contents of the note is tablet input.

The user interface includes a plurality of views. The first user input is received from a particular view that displays a particular business object. Binding the created note to one of the business objects includes making the note accessible from the particular view and also from any other view that displays the particular business object.

The views do not contain any pre-defined user interface elements for displaying notes.

The techniques can be implemented to realize one or more of the following advantages.

Users can make notes during use of the business data processing application. Users can handwrite the notes using a tablet and stylus, for example. This enables the content of the notes, particularly graphical content, to be entered quickly.

The notes make it easy to access or navigate to the business data in the application. Users can see all the notes in one listing and use the listing as mechanism for navigating to the business data.

The binding of notes to the business data enables the notes to be accessible from any view of the business data, not just from the particular view from which the notes were created.

In designing the application, the application developer does not need to insert note controls into the views. Instead, the notes functionality can be provided automatically by a run-time framework. One implementation of the invention provides all of the above advantages.

Details of one or more implementations of the invention are set forth in the accompanying drawings and in the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
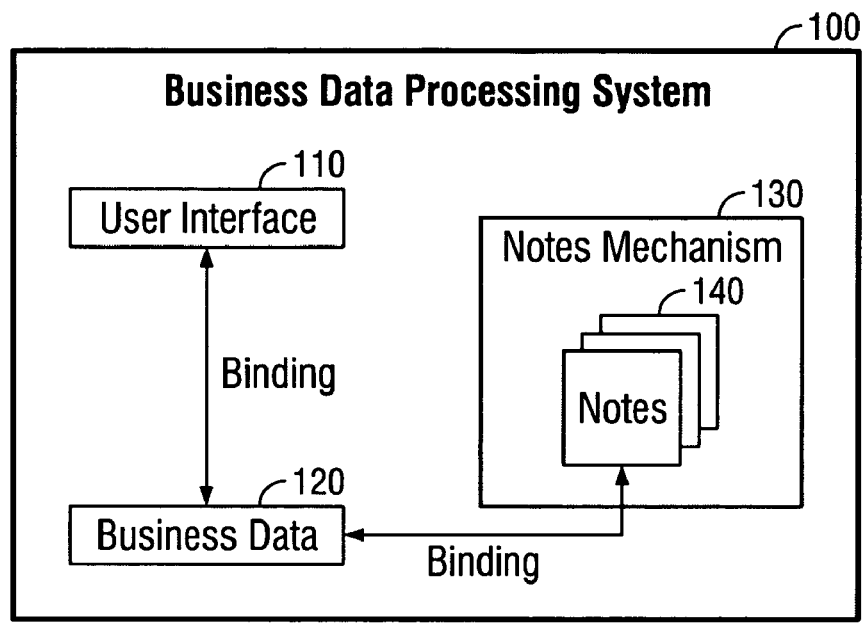
FIG. 1 is a block diagram of a business data processing application in accordance with the invention.

As shown in FIG. 1, a business data processing application 100 in accordance with the invention includes a user interface 110 through which users can view and modify business data 120 maintained by the application 100. One example of such an application is a customer relationship management (CRM) application, for example, the mySAP CRM application, available from SAP AG of Walldorf (Baden), Germany.

The application 100 also includes a notes tool 130 that allows users to create, edit, and store one or more electronic notes 140 in the application 100. In one implementation, the application 100 runs on a software framework that provides a set of run-time services to the application 100 and the notes tool 130 is one of the run-time services provided by the software framework.

The notes 140 contain content, for example text or drawings, in an unstructured format. The content can be typed content, i.e., content entered on a keyboard or the like. The content can also be handwritten content, for example, content composed by hand and supplied to the application 100 through a tablet pen or an interactive screen. Optionally, the notes can also contain media attachments, for example, small video or audio clips.

The user can control access to the notes. For example, if the user desires to keep the notes private, he can restrict other users from accessing the notes.

Figure 2:
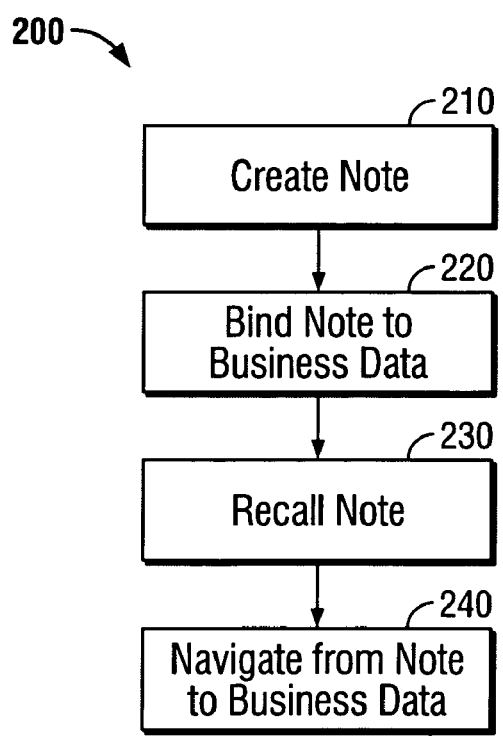
FIG. 2 is a flow diagram of a method in accordance with the invention.

During execution of the application, as illustrated by method 200 of FIG. 2, the application 100 receives user input requesting creation of a note 140 (step 210). This might occur when the user desires to make certain modifications to the business data 120, but does not have time to type in all the modifications in the particular format that is required by the application 100. Using the notes tool 130, the user can quickly make a note 140 of the desired modifications and bind the note 140 to the business data 120 (step 220).

At a later time, the user can recall the note 140 (step 230) and navigate directly to the business data 120 bound to the note 140 (step 240). Thus, the notes tool 130 serves not only as a note-taking tool, but also as a tool for bookmarking the business data 120 so as to facilitate later access or navigation to the business data 120.

Figure 3:
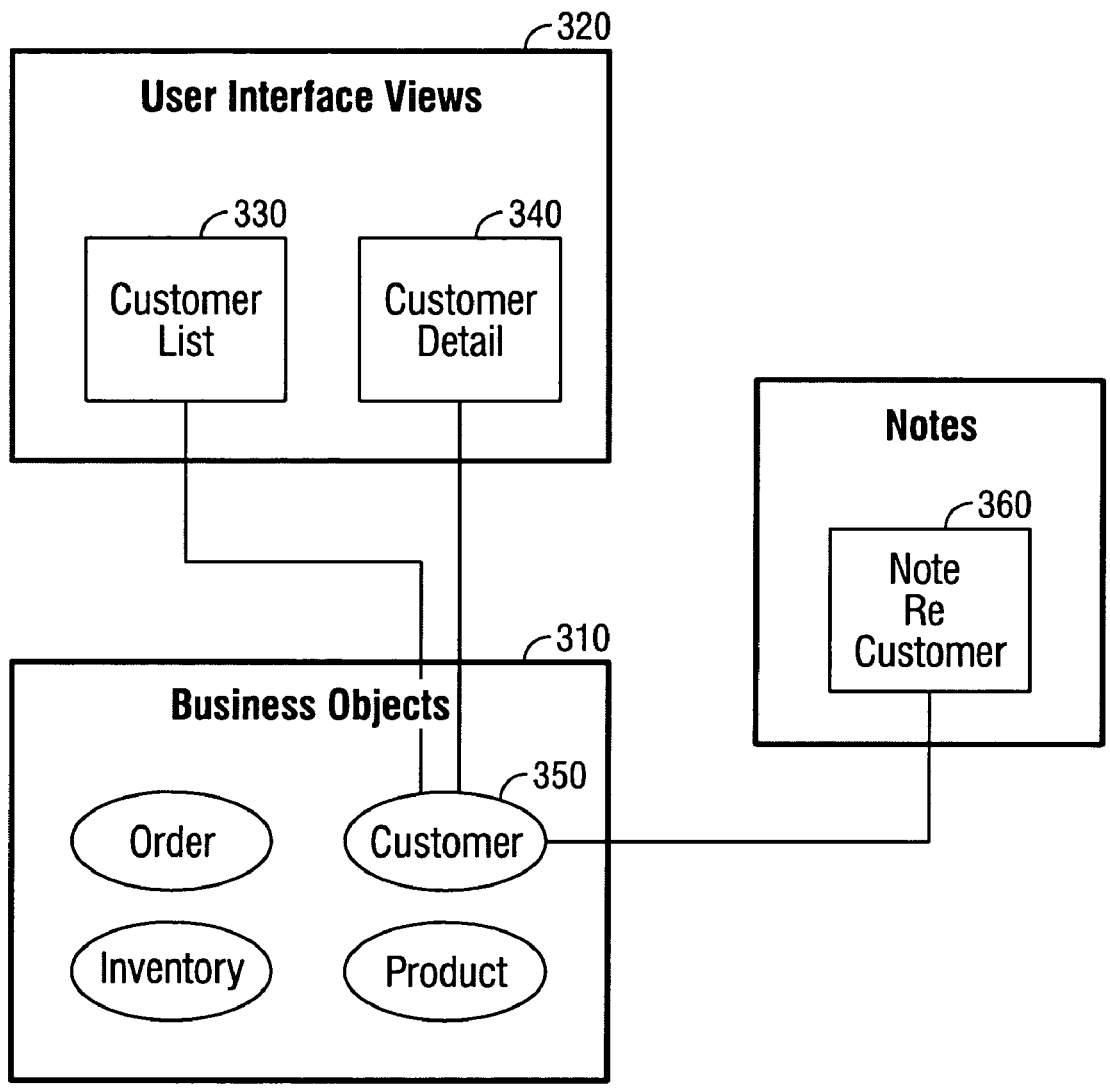
FIG. 3 illustrates the relationship between user interface views, business objects, and notes.

In one implementation, shown in FIG. 3, the business data 120 includes a set of business objects 310 and the user interface 110 includes a collection of views 320.

Each business object is a unit of access and management of the business data 120. Each business object is an object in the object-oriented programming sense. For example, the business objects 310 can include objects representing customers, orders, products, and inventories.

Each view 320 displays one or more of the business objects 310. During design time of the application, an application developer defines the layout and content of the views. That is, the developer defines which business objects will be displayed on each view and how the business objects will be arranged. For example, they could be arranged as a table or as a form containing data fields. During execution of the application, only one view 320 is displayed at a given time. The application provides navigation tools that allow users to select a different view 320 to be displayed.

The notes 140 can be created from any view 320 that displays a business object 310. Furthermore, these views do not need to contain any pre-defined user interface elements for displaying notes 140. In other words, in designing these views, the application developer does not need to add notes functionality to these views. Instead, the notes functionality can be provided automatically by the notes tool 130.

To create a new note, the user invokes the notes tool 130 from a particular view 320, which will be referred to as the originating view. Once invoked, the notes tool 130 opens a blank note and shifts input focus from the originating view to the note. The user can then fill in the contents of the note and close the note. Closing the note causes the input focus to shift back to the originating view.

The notes tool 130 binds the created note to the business object displayed on the originating view. In one implementation, if multiple objects are displayed, the notes tool 130 binds the created note to only one of the multiple displayed objects. For example, in designing the view, the system developer can designate one of the multiple displayed objects as being the root object. In such cases, the notes tool 130 can bind the created note to the root object of the origination view.

Once a note is created, the notes tool 130 displays a note icon on the originating view for the note 130. Users can click on the note icon to view or edit the note. The notes tool 130 also displays a corresponding note icon on all other views that display the same business object as the originating view. This allows the created note to be accessed not only from the originating view, but also from any other view that displays the same business object as the originating view. For example, FIG. 3 shows a customer list view 330 for displaying a list of customers and a customer details view 340 for displaying a detailed view of a customer. Both of these views 330 and 340 are bound to the customer object 350. Thus, if a note 360 were created from the customer details view 340, it would be accessible not only from this view, but also from the customer list view 330.

Multiple notes can be created from the same view and be bound to the same business object.

List of Notes

Figure 4:
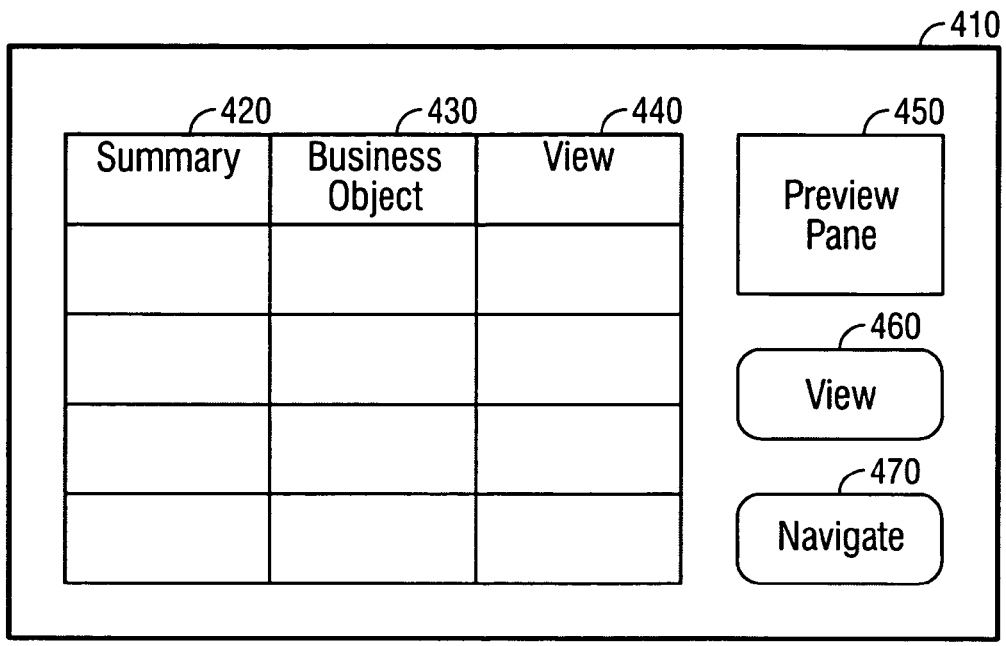
FIG. 4 illustrates an example of a listing of notes.

In one implementation, shown in FIG. 4, the notes mechanism 130 can display a list 410 of all notes. From this list, users can select individual notes to be deleted or to be recalled for viewing.

The list includes a summary 420 of each note. For example, the summary 420 can contain the first line of text from the note. For handwritten notes, the handwritten input can be converted to text using conventional handwriting recognition techniques. The converted text can be displayed as part of the summary 420 of the note.

For each note, the list can also display other information that may be useful to the user in deciding which note to recall. For example, the user may wish to recall notes that pertain to particular business objects or particular views. Thus, for each note, the list can display information that identifies the business object 430 that the note is attached to as well as the originating view 440 from which the note was created.

The notes tool 130 displays a preview of the selected note in a preview pane 450. The user then has the option of recalling just the note by itself or, alternatively, recalling both the note and the business object that is bound to the note. In FIG. 4, these two options are illustrated by the view button 460 and the navigate button 470, respectively. When the navigate option is selected, the notes tool 130 navigates to the originating view 440 for the selected note. That is, the notes tool 130 closes the list 410 of notes and opens the originating view 440 along with the selected note. When the view option is selected, the notes tool 130 does not navigate to the originating view 440 but instead keeps the list 410 of notes open. The notes tool 130 then opens the selected note. The note can be opened in a variety of ways; for example, it can be opened in a small window superimposed on top of the list of notes 410.

Client-Server Implementation

Figure 5:
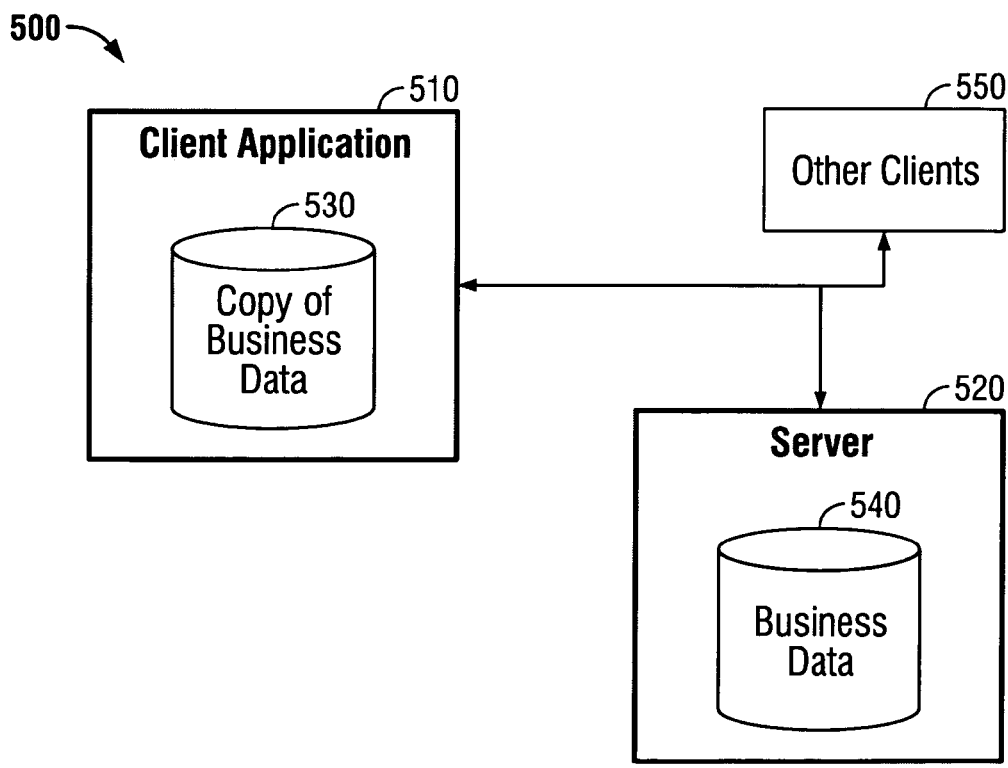
FIG. 5 illustrates a client-server implementation.

In one implementation, shown in FIG. 5, the application 100 is a client-server application 500 that includes a client application 510 and a server application 520. The client application 510 is designed to be used off-line (i.e., not connected to the server application 520). This allows the client application 510 to be used, for example, by a salesperson out in the field without an Internet connection. The client application 510 can run on laptop computer, a cellular phone, or other mobile device.

The client application 510 maintains its own local copy 530 of the business data that is maintained by the server application 520. While the client application 510 is off-line, the salesperson can make changes to the client copy 530 of the business data and then synchronize the client copy 530 with the server copy 540 at a later time, when a network connection becomes available.

The notes 140 can remain local to the client 510. In other words, the notes 140 are not transferred to the server 520 during the client-server synchronization process. Alternatively, the notes can be transferred to the server 520. This allows the user to access the notes from other clients 550, or alternatively, allows other users to access the notes.

Import and Export of Notes

In one implementation, the notes tool 130 supports importing and exporting of notes. External notes, that is, notes created by external notes tools can be imported into the application 100. For example, a user can drag an external note into the application 100 and drop it onto a view 320. In response, the notes tool 130 binds the external note to the view in the same manner as if the external note had been created from that view in the first place.

Conversely, notes created within the application 100 can be exported to external applications, for example, to external messaging applications. In one implementation, when a note is exported, the notes tool 130 adds a header to the note that contains information related to the note, for example, the name of the business object that the note is bound to.

Shortcuts from Notes

In one implementation, a user can create a shortcut from a note and add the shortcut to his desktop. The shortcut facilitates later return to the originating view for the note. In other words, selecting the shortcut from the desktop causes the application 100 to begin executing with the originating view displayed, and optionally the note displayed also.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described herein, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. For example, instead of binding the notes to the content of the views (e.g., to the business data displayed on the views), the notes tool can instead, bind the notes to the views themselves and allow for navigation to the views from the notes. As another example, the operations of the invention can be performed in a different order and still achieve desirable results. Also, in certain implementations, multitasking and parallel processing may be preferable. Other embodiments are within the scope of the following claims.

What is claimed is:

1. A computer program product, tangibly embodied in a computer-readable medium, the computer program product comprising instructions operable to cause data processing apparatus to perform operations comprising:

displaying business data on a user interface through which users can view the business data and provide input modifying the business data, the business data comprising a plurality of business objects, the user interface including a plurality of views that do not contain pre-defined user interface elements for displaying notes;

receiving one or more first user inputs from a particular view that displays one or more business objects, each first user input requesting creation of a note and specifying the contents of the note to be created;

in response to each of the first user inputs, creating a note, binding the note to one of the business objects, and making the note accessible from the particular view and also from any other view that displays the business object bound to the note;

receiving a second user input selecting one of the notes; and in response to the second user input, navigating from the selected note to the business object bound to the selected note.

2. The product of claim 1, wherein receiving a second user input selecting one of the created notes includes:

receiving user input selecting a note from a displayed list of notes.

3. The product of claim 2, wherein in response to the second user input, navigating from the selected note to the business object bound to the selected note includes:

closing the displayed list of notes; and displaying the business object bound to the selected note.

4. The product of claim 1, wherein:

displaying business data includes displaying the business data in a structured format; and the content of the note is specified in an unstructured format.

5. The product of claim 1, wherein:

the input modifying the business data is keyboard input; and the first user input specifying the contents of the note is tablet input.

6. A method comprising:

displaying business data on a user interface through which users can view the business data and provide input modifying the business data, the business data comprising a plurality of business objects, the user interface including a plurality of views that do not contain any pre-defined user interface elements for displaying notes;

receiving one or more first user inputs from a particular view that displays one or more business objects, each first user input requesting creation of a note and specifying the contents of the note to be created;

in response to each of the first user inputs, creating a note, binding the note to one of the business objects, and making the note accessible from the particular view and also from any other view that displays the business object bound to the note;

receiving a second user input selecting one of the notes; and in response to the second user input, navigating from the selected note to the business object bound to the selected note.

7. The method of claim 6, wherein receiving a second user input selecting one of the created notes includes:

receiving user input selecting a note from a displayed list of notes.

8. The method of claim 7, wherein in response to the second user input, navigating from the selected note to the business object bound to the selected note includes:

closing the displayed list of notes; and displaying the business object bound to the selected note.

9. The method of claim 6, wherein:

displaying business data includes displaying the business data in a structured format; and the content of the note is specified in an unstructured format.

10. The method of claim 6, wherein:

the input modifying the business data is keyboard input; and the first user input specifying the contents of the note is tablet input.

11. Apparatus comprising:

means for displaying business data on a user interface through which users can view the business data and provide input modifying the business data, the business data comprising a plurality of business objects, the user interface including a plurality of views that do not contain pre-defined user interface elements for displaying notes;

means for receiving one or more first user inputs from a particular view that displays one or more business objects, each first user input requesting creation of a note and specifying the contents of the note to be created;

means for, in response to each of the first user inputs, creating a note, binding the note to one of the business objects, and making the note accessible from the particular view and also from any other view that displays the business object bound to the note;

means for receiving a second user input selecting one of the notes; and means for, in response to the second user input, navigating from the selected note to the business object bound to the selected note.

12. The apparatus of claim 11, wherein the means for receiving a second user input selecting one of the created notes includes:

means for receiving user input selecting a note from a displayed list of notes.

13. The apparatus of claim 12, wherein the means for, in response to the second user input, navigating from the selected note to the business object bound to the selected note includes:

means for closing the displayed list of notes; and means for displaying the business object bound to the selected note.

14. The apparatus of claim 11, wherein:

the means for displaying business data includes means for displaying the business data in a structured format; and the content of the note is specified in an unstructured format.

15. The apparatus of claim 11, wherein:

the input modifying the business data is keyboard input; and the first user input specifying the contents of the note is tablet input.

* * * * *